United States Patent [19]

Takemoto et al.

[11] Patent Number: 5,606,158
[45] Date of Patent: Feb. 25, 1997

[54] COLLECTION AND PROCESSING APPARATUS OF REPEATEDLY USED RECORDING MEDIA

[75] Inventors: Takatoshi Takemoto; Hiroyuki Yatsu, both of Tokyo, Japan

[73] Assignee: Kabushiki Kaisha Ace Denken, Tokyo, Japan

[21] Appl. No.: 379,546

[22] PCT Filed: Aug. 3, 1993

[86] PCT No.: PCT/JP93/01087

§ 371 Date: Feb. 3, 1995

§ 102(e) Date: Feb. 3, 1995

[87] PCT Pub. No.: WO94/03245

PCT Pub. Date: Feb. 17, 1994

[30] Foreign Application Priority Data

Aug. 4, 1992 [JP] Japan .................................. 4-208118

[51] Int. Cl.[6] .............................. G06K 5/00; G06K 17/00
[52] U.S. Cl. ............................................ 235/380; 235/487
[58] Field of Search ...................................... 235/380, 487; 902/23

[56] References Cited

U.S. PATENT DOCUMENTS

| | | |
|---|---|---|
| 4,048,475 | 9/1977 | Yoshida . |
| 5,321,239 | 6/1994 | Masubuchi et al. ................. 235/380 |

FOREIGN PATENT DOCUMENTS

| | | | |
|---|---|---|---|
| 3432567 | 3/1986 | Germany . | |
| 61-70680 | 4/1986 | Japan ................................. 235/487 |
| 61-87259 | 5/1986 | Japan . | |
| 2-30389 | 2/1990 | Japan . | |
| 2-50897 | 2/1990 | Japan ................................. 235/380 |
| 2-253393 | 10/1990 | Japan ................................. 235/380 |
| 2-278547 | 11/1990 | Japan . | |
| 3-121087 | 5/1991 | Japan . | |
| 3-269693 | 12/1991 | Japan ................................. 235/380 |
| 4-42390 | 2/1992 | Japan ................................. 235/380 |
| 4-195494 | 7/1992 | Japan ................................. 235/493 |
| 4-242683 | 8/1992 | Japan . | |
| 5-42250 | 2/1993 | Japan . | |
| 5-96058 | 4/1993 | Japan . | |
| 5-111570 | 5/1993 | Japan . | |
| 43-024901 | 12/1993 | WIPO ................................. 235/380 |

*Primary Examiner*—John Shepperd
*Attorney, Agent, or Firm*—Lowe, Price, LeBlanc & Becker

[57] ABSTRACT

A collection and processing apparatus for recycling recording media which are capable of erasably recording data and are repeatedly usable is disclosed. The apparatus comprises a main transport passage (17) for transporting a recording medium (3) taken in from the outside, a record data reader (15) for reading at least data indicating the number of recycle times of the recording medium taken in from the outside, written in a specific area of the recording medium, a controller (110) for determining whether or not the recording medium is to be reused based on the read data indicating the number of recycle times, if the recording medium is not reused, the controller for outputting a discarding command and if it is reused, for updating the number of recycle times and outputting data indicating the updated number of recycle times and a number-of-times write command, a separation section (16) for separating the recording medium for which the discarding command is issued from the main transport passage, and a number-of-times writer (19) for writing data indicating the number of recycle times of the recording medium into a specific area of the recording medium upon receipt of the number-of-recycle-times command.

12 Claims, 9 Drawing Sheets of recycle times for automatically discarding record-
ing media without delay or waste.

To this end, according to the invention, there is provided
a recording medium collection and processing apparatus for
recycling recording media which are capable of erasably
recording data and are repeatedly usable, the apparatus
comprising:

- a main transport passage for transporting a recording
  medium taken in from the outside;
- a record data reader for reading at least data indicating the
  number of recycle times of the recording medium taken
  in from the outside, written in a specific area of the
  recording medium;
- a controller for determining whether or not the recording
  medium is to be reused based on the read data indicat-
  ing the number of recycle times, if the recording
  medium is not reused, the controller outputting a dis-
  carding command, and if it is reused, updating the
  number of recycle times and outputting data indicating
  the updated number of recycle times and a number-of-
  times write command;
- a separation section for separating the recording medium
  for which the discarding command is issued from the
  main transport passage; and
- a number-of-times writer for writing data indicating the
  number of recycle times of the recording medium into
  a specific area of the recording medium upon receipt of
  the number-of-times write command.

The collection and processing apparatus of the invention
can further include an eraser for erasing record data written
onto the recording medium to be reused.

The collection and processing apparatus of the invention
can further include a display for displaying the contents of
record data read by the record data reader.

The collection and processing apparatus of the invention
can further include a first stacker for storing recycled record-
ing media and a second stacker for storing recording media
to be discarded.

The controller used in the invention comprises means for
counting the number of recycled recording media and means
for counting the number of recording media to be discarded.

The collection and processing apparatus of the invention
can further include a display for displaying the number of
recycled recording media counted by the counting means
and a display for displaying the number of recording media
to be discarded, counted by the counting means.

The controller can check whether or not the number of
recycled recording media reaches a capacity of the first
stacker and whether or not the number of recording media to
be discarded reaches a capacity of the second stacker, and if
either of the numbers reaches the capacity of the correspond-
ing stacker, the controller can cause the display for display-
ing the contents of record data to display a prestored
message requesting the recording media to be taken out from
the stacker.

For example, a card having material to allow a physical
change to be made locally and reversibly as a recording layer
can be used as a recording medium. For example, a medium
can be used which comprises an organic substance having an
optical characteristic of transmittance, etc., changing revers-
ibly with a temperature disposed as a recording layer.

In the invention, the number of times the recording
medium has been recycled is recorded in a specific area of
the reused recording medium, whereby when the game play
media are collected, first the number of recycle times
recorded on the recording medium can be read for deter-

COLLECTION AND PROCESSING APPARATUS OF REPEATEDLY USED RECORDING MEDIA

TECHNICAL FIELD

This invention relates to a collection and processing
apparatus of recording media on which necessary items are
erasably recorded for transferring information, and in par-
ticular to a recording medium collection and processing
apparatus which separates recording media according to
whether or not they can be used, and processes only usable
recording media so as to recycle them.

TECHNICAL BACKGROUND

In a gaming house containing gaming machines such as
pinball machines, a player plays games at a gaming machine
and obtains game play media by winning games. The
number of game play media won by the player is counted
using a game play media counter, for example. The game
play media counter records the count result on paper, such
as thermosensible paper, using a recording head, and issues
a receipt. For recording, digits and a bar code indicating the
number of game play media are printed on paper, for
example.

In such a gaming house, the player receives the receipt
and can exchange the receipt for a prize equivalent to the
number of game play media indicated on the receipt at an
adjustment counter or window. The player may exchange the
receipt for cash if such a transaction is legal.

Incidentally, the applicant proposed use of repeatedly
usable recording media of card type in place of such receipts
to avoid wasting of resources in Japanese patent Application
No. Hei 3-272659 (Japanese patent Laid-Open No. Hei
5-111570, laid open to public on May 7, 1993) and Japanese
atent Application No. Hei 3-260879 (Japanese Patent Laid-
Open No. Hei 5-96058, laid open to public on Apr. 20,
1993). Since the recording media can be recycled, excellent
effects of contributing to cost reduction, resource conserva-
tion, etc., can be expected. However, the number of times
such a recording medium can be repeatedly used is finite; to
secure reliability in recording data, the recording media need
to be discarded within certain limits.

To use a large number of such recording media, for
example, in a gaming house, the recording media may be
replaced with new ones all together. However, this method
requires collection of a large number of recording media and
replacement of them all with new ones, which is labor
consuming, and is not an easy method. Simultaneous
replacement of recording media having different usage con-
ditions introduces the following problem: When the record-
ing media are considered individually, replacement of those
frequently used is delayed; whereas replacement of those
less frequently used is wasteful.

If such a problem can be solved, such recording media can
be used not only in gaming houses, but also as tickets for
parking lots and facilities, railway tickets, etc.

DISCLOSURE OF INVENTION

It is therefore an object of the invention to provide a
recording medium collection and processing apparatus
which can individually manage the number of recycle times
of each recording medium on which the record contents can
be erased for repeated use, and can determine whether or not
the recording medium is to be discarded based on the mining whether or not it reaches a predetermined number of times. Therefore, a large number of recording media different in use frequency can be managed individually. As a result, the discard time (life) of each recording medium can be known individually, eliminating wasteful processing. Each time a recording medium is collected, the number of times the recording medium has been recycled is checked, thus it can be discarded without delay.

BEST MODE FOR CARRYING OUT THE INVENTION

Referring now to the accompanying drawings, there is shown one embodiment of the invention.

Figure 1:
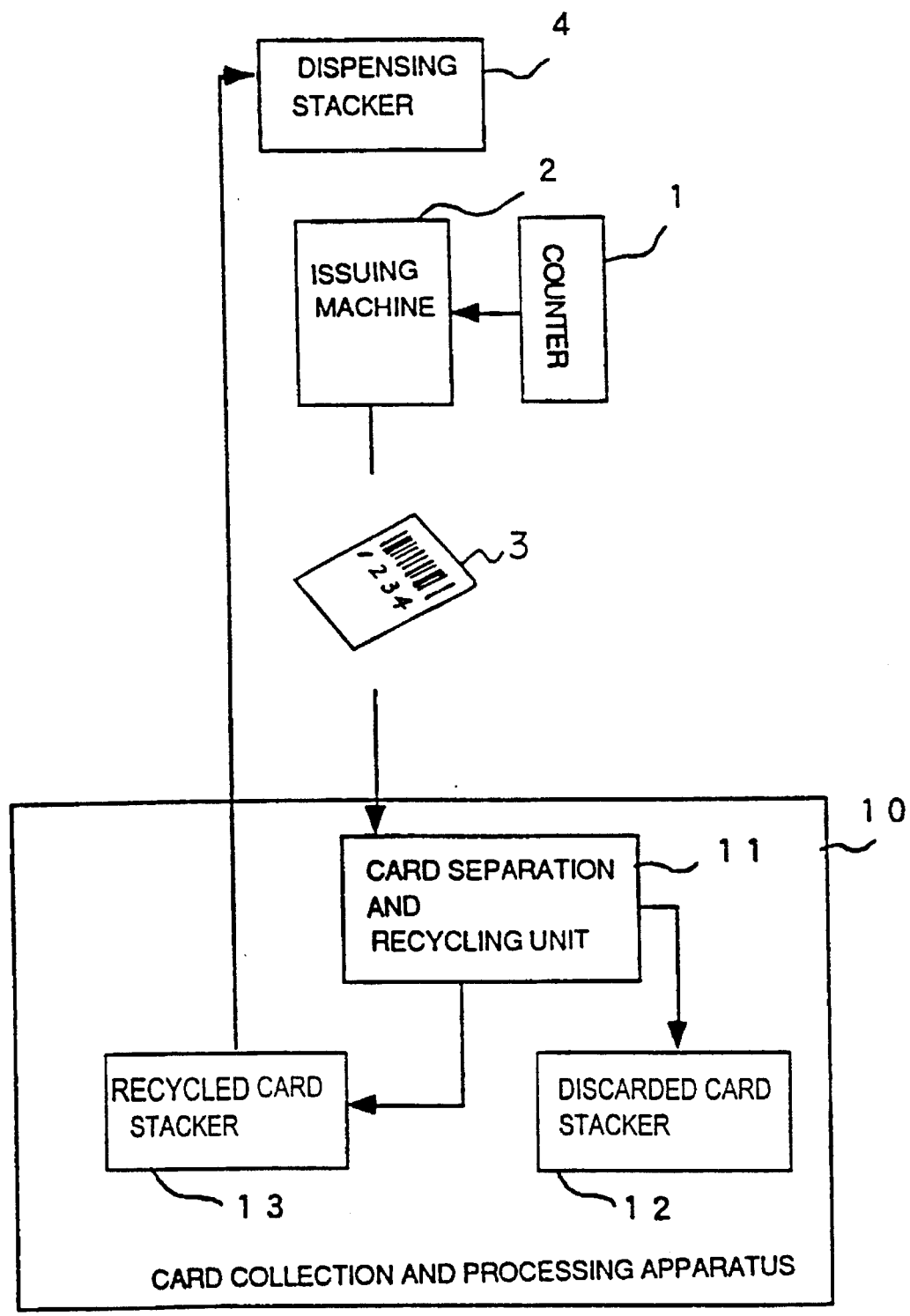
FIG. 1 is a block diagram showing the entire configuration of a recycle card system to which a recording medium collection and processing apparatus of one embodiment of the invention is applied.

FIG. 1 shows the entire configuration of a recycle card system using a card 3 as a recording medium to which a collection and processing apparatus 10 of the embodiment is applied. The recycle card system is a system for enabling cards to be repeatedly used to record the count result of a counter 1 of game play media, such as pinballs, in a gaming house.

Placed on the card issuing side are a counter 1 for counting the number of game play media, a dispensing stacker 4 for stacking cards for dispensing, and an issuing machine 2 for taking out a card from the stacker 4, reading the count result from the counter 1, and recording the count result on the card. The embodiment assumes that these components are integrated in one piece and housed in a common cabinet. Of course, they can be provided as separate units. They may be contained in a game play media lending machine or a gaming machine.

The collection and processing apparatus 10 for collecting and processing cards is placed on the card collection side. The collection and processing apparatus 10 comprises a card separation and recycling unit 11, a discarded card stacker 12 for storing discarded cards, and a recycled card stacker 13 for storing reusable cards. In the embodiment, these components are collected as an unit. The card separation and recycling unit 11 takes in cards and separates the cards according to whether or not they can be used, then recycles reusable cards. Also, it reads data recorded on the card and performs necessary processing; for example, it reads information indicating the number of game play media recorded on the card and displays it.

Figure 6A:
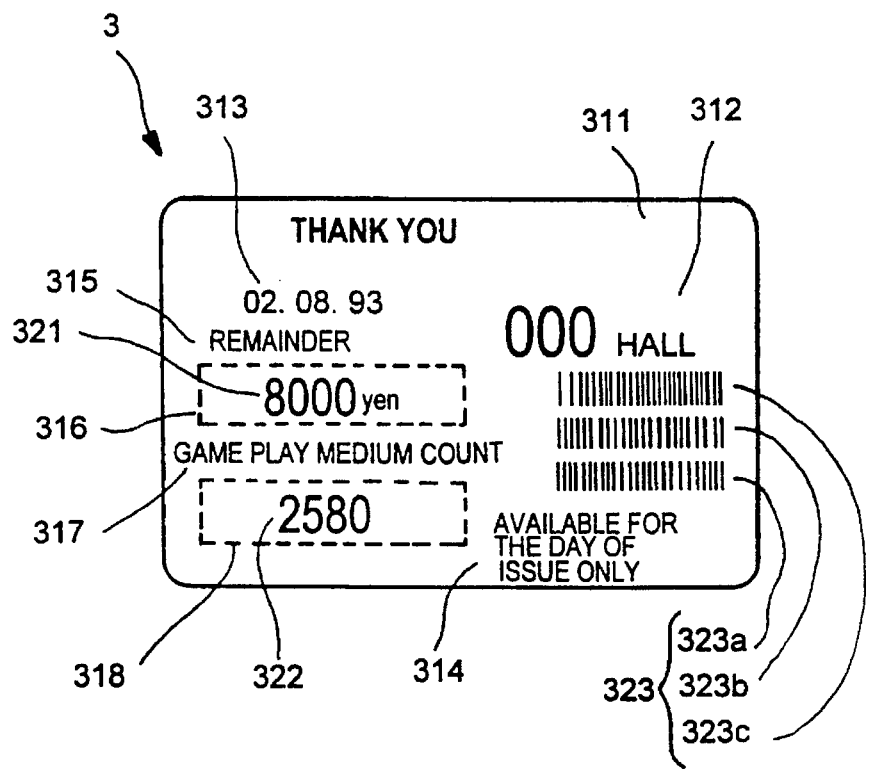
FIG. 6A is a plan view showing the structure of a card, a recording medium to be processed by the collection and processing apparatus of the invention.
Figure 6B:
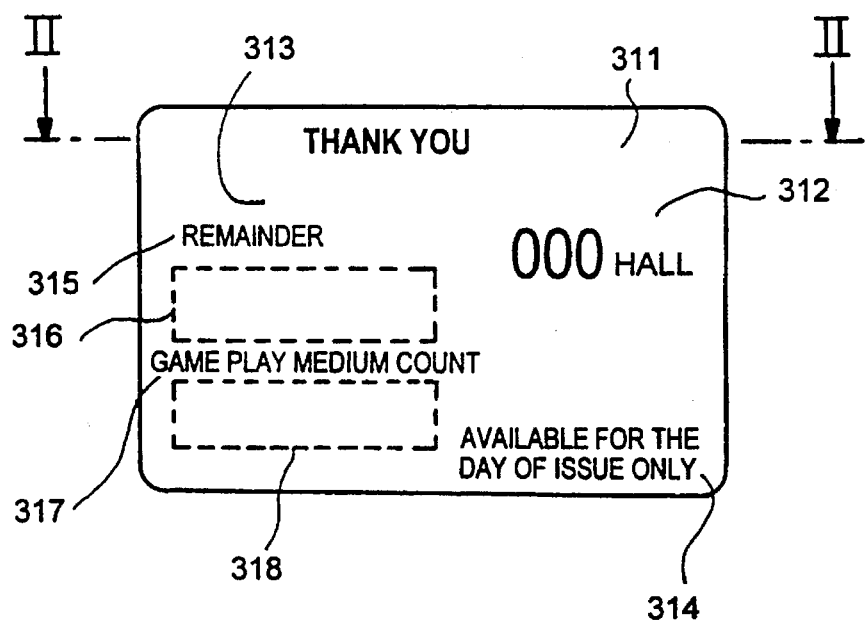
FIG. 6B is a plan view showing a state before items are recorded on the card shown in FIG. 6A.
Figure 7:
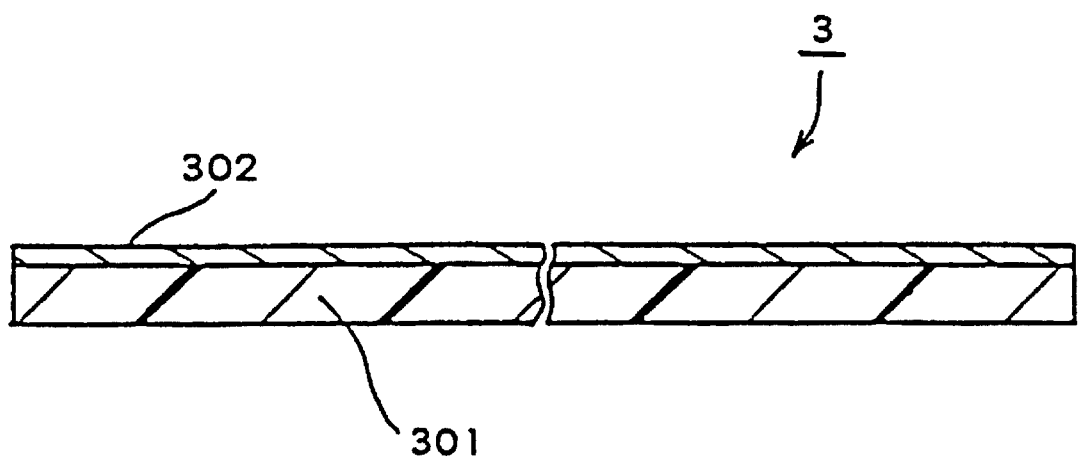
FIG. 7 is a sectional view taken on line II—II of FIG. 6B.

FIGS. 6A and 6B are external views of one example of a recording medium used in the embodiment. FIG. 7 shows the sectional structure of the recording medium.

As shown in FIG. 7, the card 3 comprises a recording layer 302 on which necessary items can be visually recorded and erased by applying heat so that the card can be used repeatedly, on a substrate 301. The recording layer 302 consists essentially of an organic compound whose crystal aggregates to a visible state upon application of heat at a first specific temperature and diffuses to an invisible state upon application of heat at a second specific temperature different from the first specific temperature. An organic compound as a specific example comprises a higher fatty acid such as a behenic acid, a lauric acid, or a stearic acid dispersed in a polymeric matrix material such as vinylidene chloride to which a small amount of a surface active agent, etc., is added. The recording layer 302 can also comprise ultrafine particles of organic molecules of a stearic acid, etc., dispersed in a vinyl chloride resin having high heat resistance, for example. The first specific temperature is a temperature of 100° C. or higher, for example; the second specific temperature is a temperature 10° C. or more higher than the first specific temperature, for example.

The surface of the recording layer 302 may be furthermore coated with a protective film.

The recording layer 302 can be made of a substance which is invisible at room temperature and when locally heated, the heated part is polycrystallized, causing light to be irregularly reflected, thus making it visible. By applying heat in a specific pattern to such a recording layer 302, the recording layer 302 can be locally polycrystallized according to the pattern for representing characters, digits, etc. On the other hand, if heat is applied at a different temperature from the predetermined temperature, for example, at a temperature about 10° C. higher than the temperature at crystallization, the crystal can diffuse, causing the characters, digits, etc., to disappear.

The card 3 has portions for indicating entries which need not be erased, in addition to the recording layer 302 on which erasable indication can be made. For example, printed on one side of the card 3 in normal ink which is difficult to erase are an indication 311 for showing thanks to customers, such as "THANK YOU," indication 312 of the gaming house name where the card can be used, indication 314 of expiration date, indication 315 "REMAINDER," and indication 317 "GAME PLAY MEDIUM COUNT."

Indication 321 of the remaining amount of money, obtained by subtracting the amount of money paid to buy game play media from the amount of money input to a game play media lending machine (in this case, 8000 yen), is written within a frame 316 by applying heat at a predetermined temperature for recording. Likewise, indication 322 of the number of game play media (in this case, 2580) is written within a frame 318 by applying heat at the predetermined temperature for recording. Date indication 313 is made above the REMAINDER indication. A bar code indication portion 323 is on the right of the REMAINDER and GAME PLAY MEDIA COUNT areas. In the bar code indication portion 323, number-of-recycle-times indication 323a, remainder indication 323b, and game play media count indication 323c are recorded in bar codes.

Figure 8:
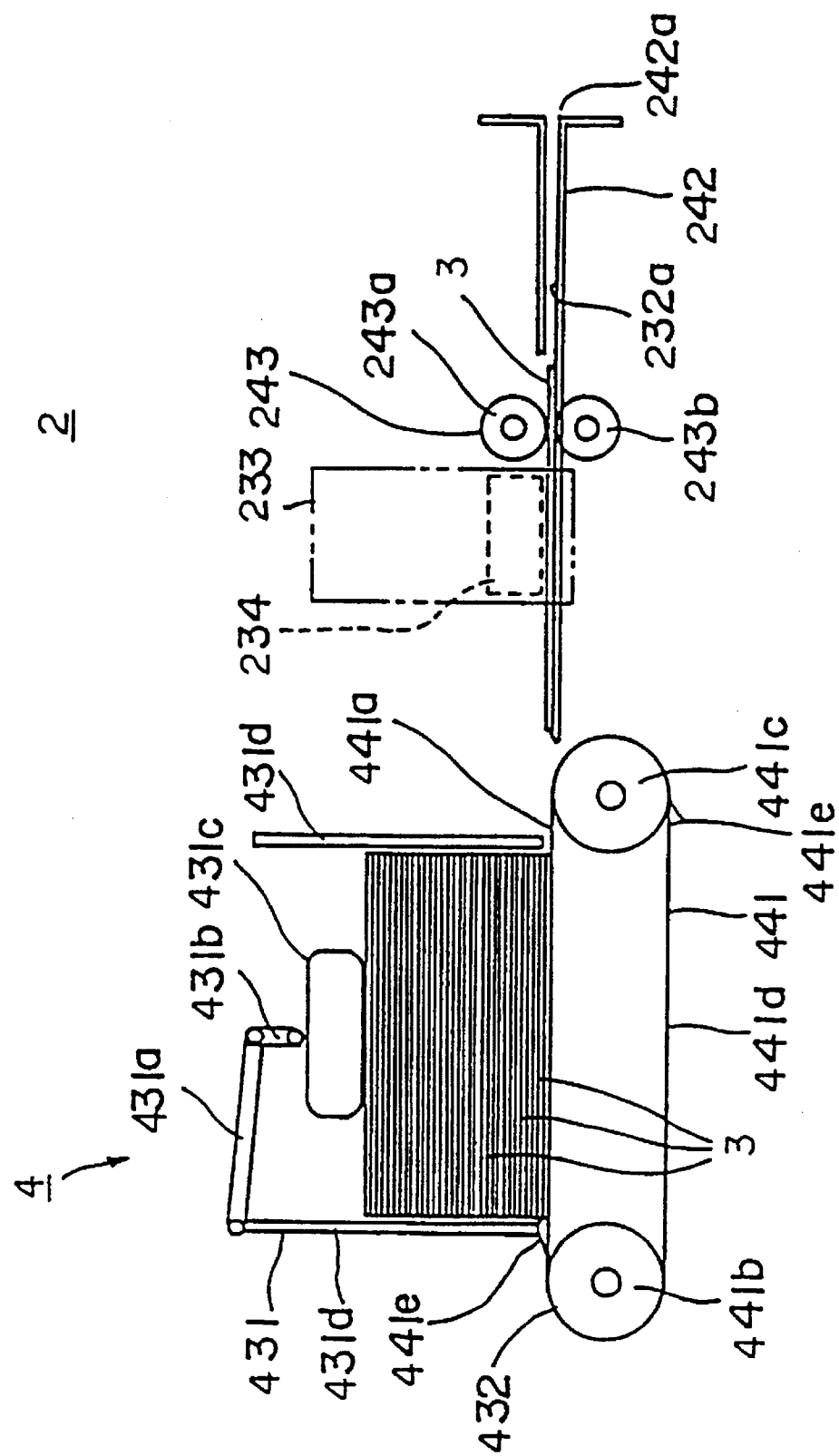
FIG. 8 is a schematic illustration showing example structures of a dispensing stacker and an issuing machine used to issue recording media to be processed by the apparatus of the invention.

The dispensing stacker 4 and the issuing machine 2 have structures as shown in FIG. 8, for example.

The dispensing stacker 4 comprises a case 431, a transporter 432, and a recording section 433. The case 431 consists of surrounding walls 431d to accommodate a plurality of cards 3 one over the other therewithin; they are used as a card holder.

One end of a lever 431a is pivotally secured to the top end of the case 431, and a weight 431c is secured via a short lever 431b to the other end of the lever 431a. The dispensing stacker 4 is adapted to supply cards 3 to the side of a transport plane 441a by pressure of the weight 431c.

The transporter 432 is adapted to take out cards 3 one at a time from the case 431 and feed them along a transport passage 432a. The transporter 432 comprises a transport belt mechanism 441.

The transport belt mechanism 441 is disposed below the surrounding walls 431d so that a gap to allow cards 3 to be discharged one at a time can be formed between the transport belt mechanism 441 and the surrounding walls 431d of the case 431 to place the card 3 within the surrounding walls 431d on the transport plane 441a. More particularly, the transport belt mechanism 441 has an endless belt 441d placed on a driving pulley 441b and a driven pulley 441c for moving the card 3 on the transport plane 441a in the gap direction by power. The endless belt 441d has two engagement parts 441e, 441e for engagement with one card 3 placed on the transport plane 441a.

The issuing machine 2 has a recording section 233, a transport roller 243, and a transport guide 242.

The transport guide 242 has a transport passage 232a for guiding a card 3 discharged from the transport belt mechanism 441 and a card outlet 242a, a card discharge section, disposed at the end of the transport passage 232a.

The transport rollers 243 comprise a pinch roller 243a and a card drive roller 243b, between which the transport passage 232a is sandwiched downstream of the recording section 233. The transport rollers 243 are adapted to be driven by power for transporting cards 3 from the gap through the transport passage 232a of the transport guide 242 to the card outlet 242a.

The recording section 233 is disposed along the transport passage 232a. The recording section 233 contains a thermal head 234 for writing characters, etc., and heating means (not shown) for heating the thermal head 234 to a predetermined temperature. The recording section 233 applies heat at a predetermined temperature to cards 3 transported one at a time upon receipt of an external signal for visually indicating the date, the remaining amount, and the number of game play media and also recording bar codes representing the remaining amount and the number of game play media.

Figure 2:
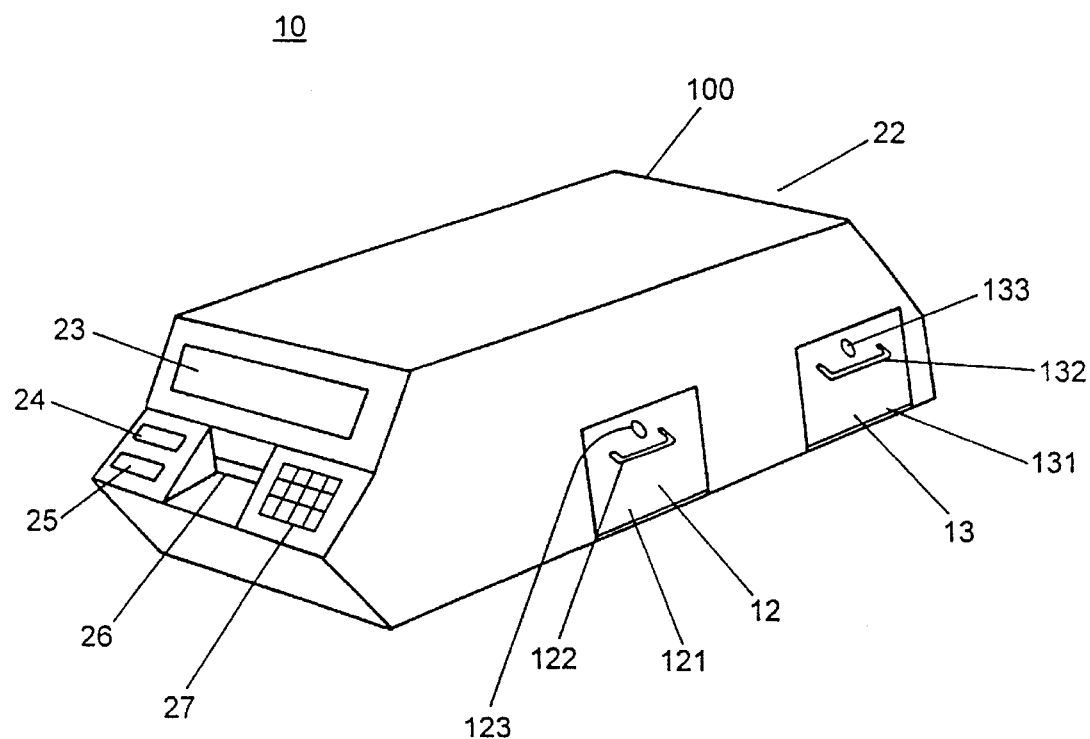
FIG. 2 is a perspective view showing the appearance of the recording medium collection and processing apparatus of the embodiment of the invention.
Figure 3:
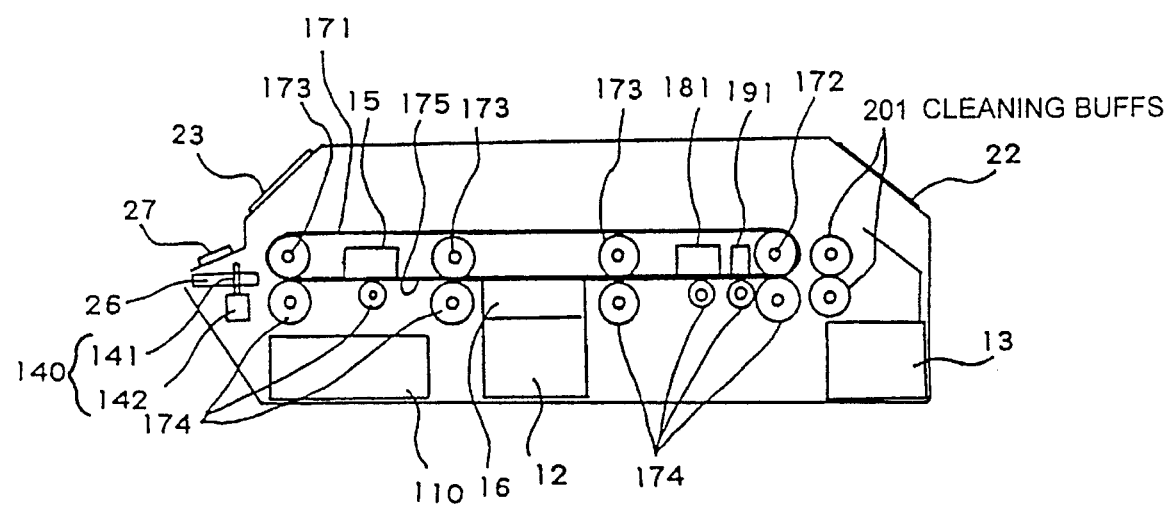
FIG. 3 is a sectional view schematically showing the internal structure of the recording medium collection and processing apparatus of the embodiment of the invention.

FIG. 2 shows the appearance of the collection and processing apparatus of the embodiment. FIG. 3 schematically shows the internal mechanism of the apparatus.

As shown in FIGS. 2 and 3, a cabinet 100 houses various devices. Display and operation members are placed on one end of the cabinet 100. The collection and processing apparatus has a player data display 22, a personnel data display 23, a number-of-recycled-cards display 24, and a number-of-discarded-cards display 25 as display members. Also, the collection and processing apparatus has a cardslot 26 and an input unit 27 provided with operation keys, including a ten-key numerical pad, as operation members.

The personnel data display 23 is made of, for example, a liquid crystal display device for displaying information such as data recorded on cards and messages of the collection and processing apparatus for personnel in the gaming house. The player data display 22 is made of a liquid crystal display device like the personnel data display 23; it is placed on the end opposed to the personnel data display 23. The number-of-recycled-cards display 24 and the number-of-discarded-cards display 25 are each made of a liquid crystal display device. The number-of-recycled-cards display 24 displays the current number of cards recycled by the apparatus and stored in the recycled card stacker 13. The number-of-discarded-cards display 25 displays the current number of discarded cards determined to be unreusable by the apparatus and stored in the discarded card stacker 12.

Further, provided on the side of the apparatus are a door 121 for taking out cards from the discarded card stacker 12 and a door 131 for taking out cards from the recycled card stacker 13. The door 121 is provided with a knob 122 and a keyhole 123. The door 131 is provided with a knob 132 and a keyhole 133.

Figure 4:
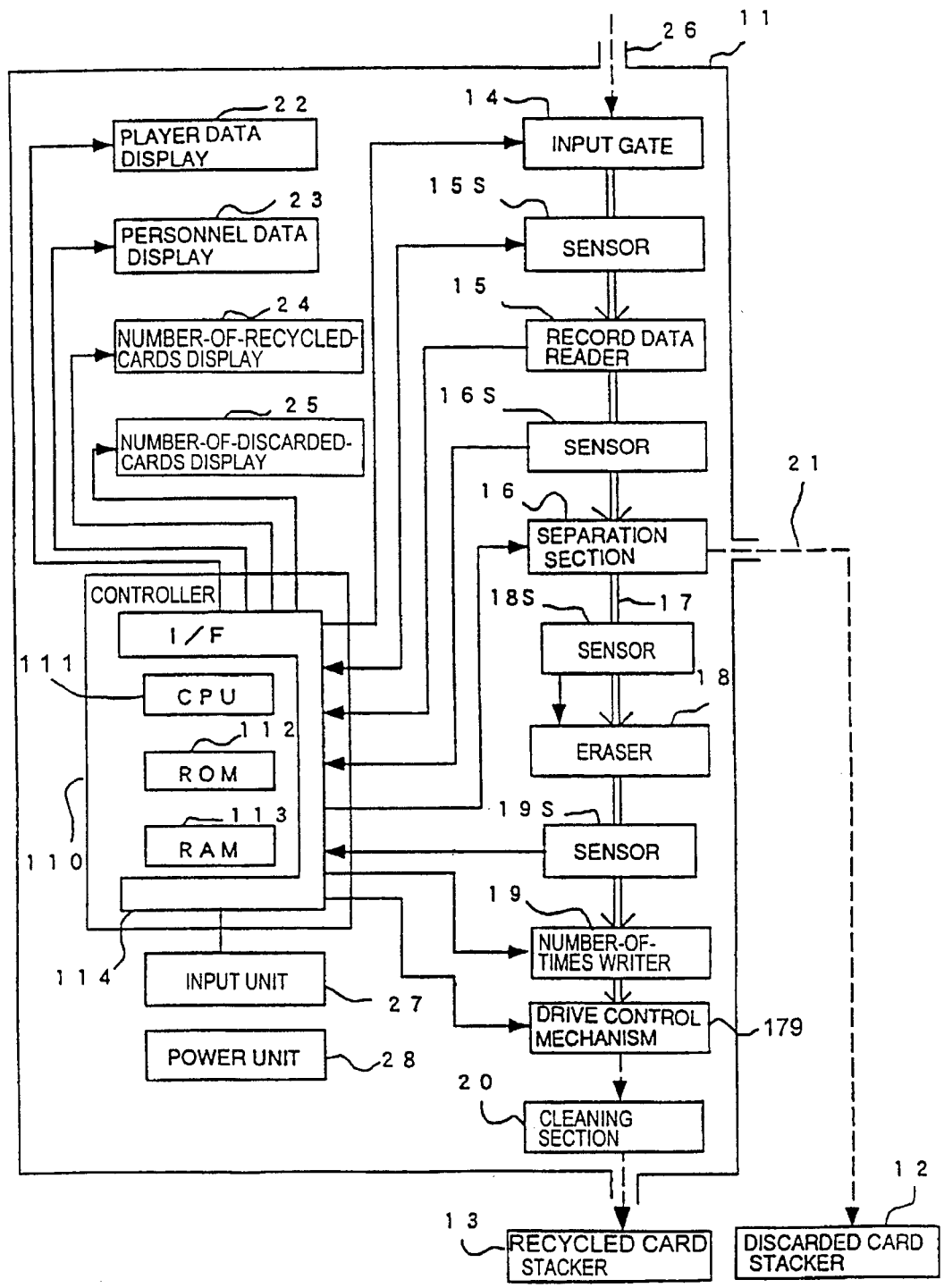
FIG. 4 is a block diagram showing the function of a card separation and recycling unit, a component of the recording medium collection and processing apparatus of the embodiment of the invention.

As shown in FIGS. 3 and 4, the collection and processing apparatus of the invention contains a main transport passage 17 for transporting cards input to the card slot 26 to the opposed end and an input gate 14, a record data reader 15, a separation section 16, an eraser 18, a number-of-times writer 19, a cleaning section 20, and a power unit 28 placed along the transport passage 17. Sensors 15S, 16S, 18S, and 19S for sensing card access are placed on the entrance sides of the record data reader 15, the separation section 16, the eraser 18, and the number-of-times writer 19 respectively. The power unit 28 is provided with a backup battery (not shown).

The collection and processing apparatus of the embodiment has a controller 110 for processing read data and controlling the mentioned parts. The controller 110 comprises a central processing unit (CPU) 111 for executing operations, etc., a read-only memory (ROM) 112 for storing programs, control constants, messages, etc., a random access memory (RAM) 113 for temporarily storing data of the operation results, etc., and an interface 114. The programs stored in the read-only memory (ROM) 112 include a program executing a procedure shown in FIG. 5, for example. Connected to the controller 110 are the displays 22 to 25, the input unit 27, the input gate 14, the sensor 15S, the record data reader 15, the sensor 16S, the separation section 16, the sensor 18S, the eraser 18, the sensor 19S, and the number-of-times writer 19.

At least a part of the RAM 113 is provided with a backup function with the battery of the power unit 28 when the power is off (not shown). The data to be saved when the power is off, such as the data of the number of recycled cards and the number of discarded cards, is stored in the battery backup area of the RAM 113.

The main transport passage 17 comprises a driving pulley 172, a plurality of driven pulleys 173, a belt 171 placed on the pulleys, rollers 174 disposed under the belt 171 for transporting cards sandwiched between the rollers and the belt 171, and a drive control mechanism of the driving pulley 172. Two sets of the pulleys 172 and 173 and the belt 171 are placed in parallel. The placement gap is set narrower than the card width. The main transport passage 17 also has two guide rails 175 for supporting cards. The roller 174 is placed between the two rails and has the height set so that a part of the outer peripheral surface of the roller slightly protrudes from the surface of the rails.

As shown in FIG. 3, the input gate 14 consists of a pin 141 that can be made to appear and disappear as desired and an actuator 142 for making the pin 141 appear and disappear, for example. The pin 141 is provided between the two belts 171 in the card slot 26. When receiving a closing command from the controller 110, the actuator 142 causes the pin 141 to project toward the main transport passage 17. On the other hand, when receiving an opening command, the actuator 142 causes the pin 141 projecting to the main transport passage 17 to be withdrawn.

Each of the sensors 15S, 16S, 18S, and 19S, which is made up of a light emitting diode and a photodiode (not shown), detects access of a card by using the fact that light from the light emitting diode to the photodiode is cut off when a card passes between the diodes. The sensor 18S sends a detection signal to the eraser 18. On the other hand, the sensors 15S, 16S, and 19S send a detection signal to the controller 110.

For the record data reader 15, a reader fitted to the recording mode of the recording media is used. In the embodiment, it is made of a bar-code reader. Since three bar codes are placed in parallel, as described above, in the embodiment, the record data reader 15 is provided with three read heads of a bar-code reader. The record data reader 15 generates numerical data from a signal output from the read heads and sends the data to the controller 110.

Figure 9:
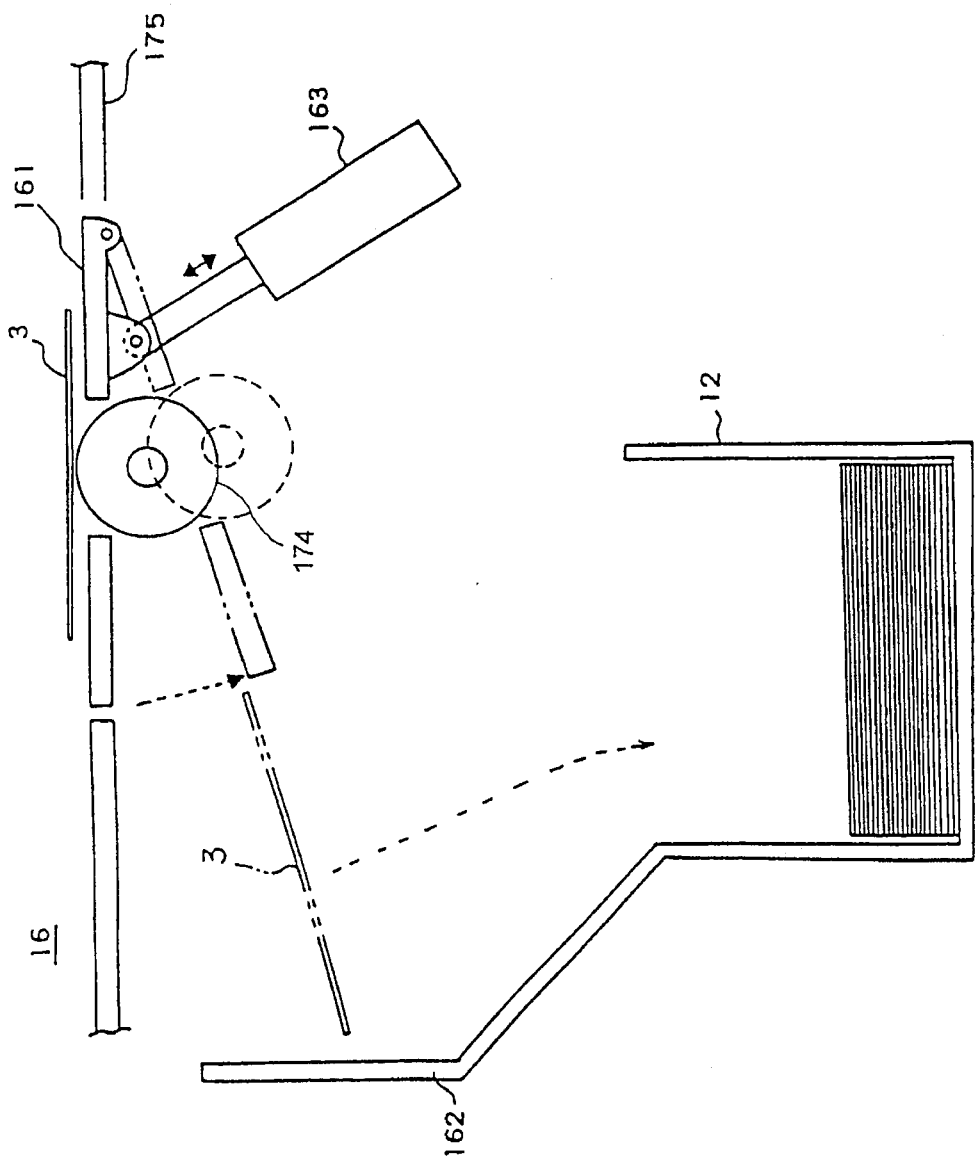
FIG. 9 is a schematic illustration showing the structure of a separation section, a constituent member of the invention.

The separation section 16, which is disposed at an intermediate point on the main transport passage 17, separates cards 3 transported on the main transport passage 17 upon receipt of an instruction from the controller 110. The separation section 16 has a structure as shown in FIG. 9, for example. That is, the separation section 16 comprises a branch rail 161 disposed in place of a part of the guide rail 175, an actuator 163 for causing the branch rail 161 to pivot downward at a given angle with one end as a supporting point and restoring the branch rail 161 to the former position, and a guide member 162 for guiding a card 3 dropping from the branch rail 161 to the discarded card stacker 12 when the branch rail 161 pivots downward. The actuator 163 causes the branch rail 161 to pivot to the angle at which the card 3 completely drops, then restores the branch rail 161 to the former position. A roller 174 is secured to the branch rail 161.

The eraser 18 has an erasion head 181 placed at a position opposed to the roller 174 and an erasion head drive circuit (not shown). The erasion head 181 comes on contact with the recording area of the card 3 and heats the area for erasing the data recorded in the area. When a card access detection signal is received from the sensor 18S, the erasion head 181 of the eraser 18 is heated by the erasion head drive circuit.

The number-of-times writer 19 has a write head 191 placed at a position opposed to the roller 174 and a write head drive circuit (not shown) for driving the write head 19. In the embodiment, the write head 191 generates a bar code. The write head 191 is provided at a position corresponding to a recording area of number-of-card-recycle-times data. When receiving a write instruction and the number-of-recycle-times data to be written from the controller 110, the number-of-times writer 19 writes a bar code representing the number of recycle times onto a predetermined area of the card.

The data indicating the number of recycle times is recorded on the card in a bar code in the embodiment, but the invention is not thus limited. Any record may be used if the number of recycle times can be read from the record through the reader 15; for example, it may be simple digits or binary magnetic data. Use of magnetic data requires that a card should be provided with a magnetic record area and that the record data reader 15 should include a magnetic read head.

The cleaning section 20 is placed following the downstream end of the main transport passage 17. In the embodiment, the cleaning section 20 comprises two cleaning buffs 201 and 201 placed at positions sandwiching a card. A rotation drive mechanism (not shown) for driving the cleaning buffs 201 and 201 for rotation is connected to either of them. The cleaning buffs 201 and 201 may be rotated with movement of a card without being connected to the rotation drive mechanism. In the embodiment, the cleaning section 20 operates independently of the controller 110, but may be driven in response to a command from the controller 110.

Figure 5:
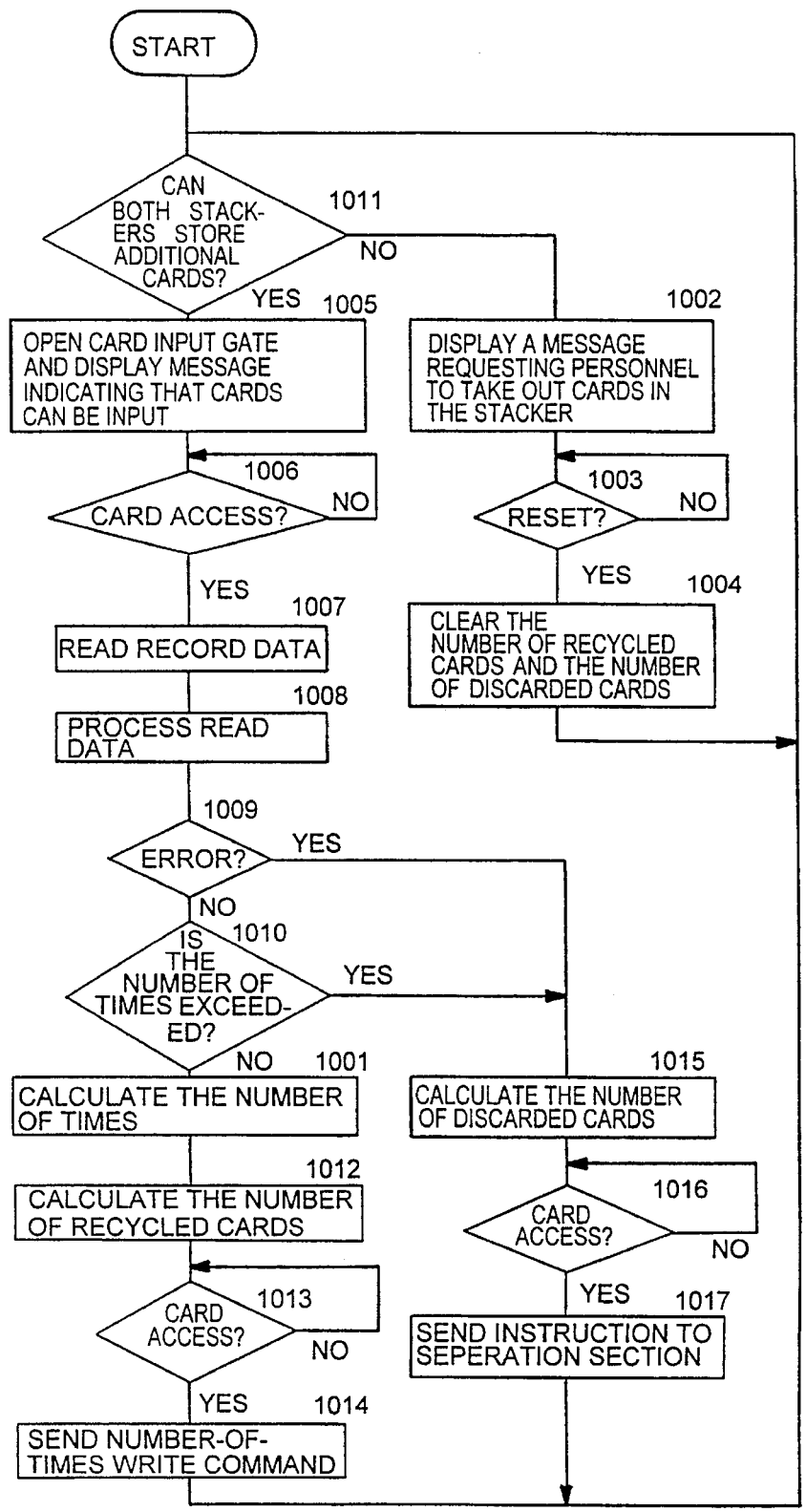
FIG. 5 is a flowchart showing an operation procedure of a controller built into the card separation and recycling unit.

Next, the operation of the embodiment will be discussed with reference to FIG. 5.

When a switch (not shown) of the power unit 27 is turned on, the power unit 27 supplies power to the collection and processing apparatus 10 for placing the apparatus 10 in an operation state.

The CPU 111 of the controller 110 first checks to ensure that each of the stackers 12 and 13 has a capacity at step 1001 by looking at the data storage areas of the number of recycled cards and the number of discarded cards in the RAM 113.

If at least one of the stackers 12 and 13 has no card capacity, the CPU 111 causes the personnel data display 23 to display a message indicating the stacker name of the stacker and requesting personnel to remove cards from the stacker and reset the system after taking out the cards at step 1002. That is, the CPU 111 reads a message corresponding to the decision made at step 1001 from the ROM 112, converts the message into image data by using font data stored in the ROM 112, and sends the image data to the personnel data display 23 for displaying the message. If the message is expanded to an image, which is stored in the ROM 112, the step converting the message into the image data is not required. Therefore, in this case, font data need not be provided either.

Next, the CPU 111 determines whether or not a reset operation has been performed through the input unit 27 at step 1003. If a reset operation is performed, the CPU 111 clears the data of the number of recycled cards and the number of discarded cards stored in predetermined areas of the RAM 113 at step 1004. Then, control returns to step 1001.

In this condition, if both the stackers 12 and 13 can store additional cards, the CPU 111 sends a command opening the card input gate 14 to the card input gate 14 at step 1005, whereby at the card input gate 14, the actuator 142 operates to withdraw the pin 141 from the main transport passage 17. Also, the CPU 111 reads a message indicating that cards can be input from the ROM 112 and sends it to the personnel data display 23 for displaying the message.

In this condition, the CPU 111 checks whether or not a signal indicating detection of card access is input from the sensor 15S at step 1006. If the detection signal is input, the CPU 111 instructs the record data reader 15 to read information recorded on the card at step 1007, then reads the information from the reader 15 and transfers necessary data to a predetermined area of the RAM 113.

The CPU 111 checks the read data for error at step 1008. For example, if a parity bit is added, the bit is checked; if ECC is added, it is checked. If an error is detected, the record on the card is low in reliability, and the card is discarded. If the issuing machine does not have an error check bit addition function, the step may be omitted.

When no error is detected, the CPU 111 determines whether or not the number of recycle times reaches a predetermined number of times at step 1010. The card reaching the prescribed number of times is not reused and is discarded. Durability of cards is previously examined by experiment, etc., to define the prescribed number of times. For example, it is defined as 50.

If the number of recycle times does not reach the prescribed number of times, the current recycle time is added for calculating the cumulative number of recycle times of the card at step 1011. That is, 1 is added to the number of recycle times read through the record data reader 15 to update the number of recycle times. Also, the number of recycled cards is calculated at step 1012. That is, the data of the number of recycled cards stored in the RAM 113 is read and is incremented by one to update the number of recycled cards. The updated number of recycled cards is stored in the predetermined area of the RAM 113.

In this condition, the separation section 16 does not perform special processing for the card. The eraser 18 erases the data recorded on the card. That is, when the sensor 18S detects a card access, it sends a detection signal to the eraser 18, which then drives the erase head 181 for erasing the data recorded on the card.

Meanwhile, the CPU 111 monitors a detection signal from the sensor 19S at step 1013.

Here, if a card access detection signal is input from the sensor 19S, the CPU 111 sends a command for writing the number of recycle times and the new found number-of-recycle-times data to the number-of-times writer 19 at step 1014. When receiving the command and the data, the number-of-times writer 19 displays a bar code representing the number of times for the card in the card area into which the number of times is to be written. The card arrives at the downstream end of the main transport passage 17, is then passed through the cleaning section 20 and sent to the recycled card stacker 13. The CPU 111 returns to step 1001.

On the other hand, if an error is detected or the number of recycle times reaches the prescribed number of times, the number of discarded cards is calculated at step 1015. That is, the data of the number of discarded cards stored in the RAM 113 is read and is incremented by one to update the number of discarded cards. The found value is stored in the RAM 113.

The CPU 111 monitors a detection signal from the sensor 16S at step 1016. When receiving a detection signal from the sensor 16S, the CPU 111 instructs the separation section 16 to place the card out of the main transport passage 17 at step 1017. When receiving the instruction, the separation section 16 operates the actuator 163 for causing the branch rail 161 to pivot so that the downstream tip of the branch rail 161 falls downward with the upstream end as a supporting point, whereby the card on the branch rail is dropped. The card drops along the guide member 162 and is stored in the recycled card stacker 13.

Thus, if the number of reference times is appropriately set as described above, cards 3 damaged, etc., can be automatically discarded efficiently. Since the eraser 20 and the cleaning means 21 are disposed on the main transport passage 17, data initialization and cleaning of cards 3 to be reused are also performed automatically.

What is claimed is:

1. A recording medium collection and processing apparatus for recycling recording media which are capable of erasably recording data and are repeatedly usable, said apparatus comprising:

a main transport passage for transporting a recording medium taken in from outside;

a record data reader for reading at least data indicating the number of recycle times of the recording medium taken in from the outside, written in a specific area of the recording medium;

a controller for determining whether or not the recording medium is to be reused based on the read data indicating the number of recycle times, if the recording medium is not reused, said controller outputting a discarding command and if it is reused, said controller updating the number of recycle times and outputting data indicating the updated number of recycle times and a number-of-times write command;

a separation section for separating the recording medium for which the discarding command is issued from said main transport passage, leaving the recording medium which has been determined to be reused on said main transport passage;

an erasing section for erasing all record data being erasable written onto the recording medium which has been left on said main transport passage as a recording medium to be reused;

a number-of-times writer for writing data indicating the number of recycle times of the recording medium into a specific area of the recording medium where said record data has been erased upon receipt of the number-of-times write command; and a first stacker for storing said recording medium which is reusable, onto which said data indicating the number of recycle times is written.

2. The recording medium collection and processing apparatus as claimed in claim 1 whereas the erasing section including an eraser erasing record data written onto the recording medium to be reused.

3. The recording medium collection and processing apparatus as claimed in claim 1 further including a display for displaying contents of record data read by said record data reader.

4. The recording medium collection and processing apparatus as claimed in claim 3 further including a second stacker for storing recording media to be discarded, which has been separated from said main transport passage in said separation section.

5. The recording medium collection and processing apparatus as claimed in claim 4 wherein said controller comprises means for counting the number of recycled recording media and means for counting the number of recording media to be discarded.

6. The recording medium collection and processing apparatus as claimed in claim 5 further including a display for displaying the number of recycled recording media counted by said counting means and a display for displaying the number of recording media to be discarded, counted by said counting means.

7. The recording medium collection and processing apparatus as claimed in claim 6 wherein said controller checks whether or not the number of recycled recording media reaches a capacity of said first stacker and whether or not the number of recording media to be discarded reaches a capacity of said second stacker, and if either of the numbers reaches the capacity of the corresponding stacker, causes said display for displaying the contents of record data to display a prestored message requesting the recording media to be taken out from said stacker.

8. The recording medium collection and processing apparatus as claimed in claim 1, further comprising a cleaning section being placed at the upstream end of said first stacker.

9. An information recording medium on which information can be recorded visibly comprising:

a recording layer on which information is recorded visibly and which is recycled for erasing recorded information and recording new information; and a number-of-recycle-times recording portion for recording information indicating the number of times said recording layer has been recycled, said recording layer and said number-of-recycle-times recording portion, respectively, being made of a substance that can be recycled a number of times, and said number-of-recycle-times recording portion having the information indicating the number of times said recording layer has been recycled in a bar code form.

10. The recording medium as claimed in claim 9 wherein said number-of-cycle-times recording portion is provided on said recording layer.

11. A recording medium collection and processing apparatus for using a recording medium repeatedly by recycling a recording section thereof, the recording section including a material being capable of recording data by changing reversibly an optical characteristic locally, and being capable of erasing the recorded data, said apparatus comprising:

a main transport passage for transporting a recording medium taken in from outside;

a record data reader for reading data indicating the number of recycle times of the recording medium taken in from the outside, and written in a specific area of the recording section by changing the optical characteristic locally;

a controller for determining whether or not the recording medium is to be reused based on the read data indicating the number of recycle times, if the recording medium, is not reused, said controller outputting a discarding command and if it is reused, said controller updating the number of recycle times and outputting data indicating the updated number of recycles times and a number- of-times write command;

a separation section for separating the recording medium for which the discarding command is issued, from said main transport passage;

an erasing section for erasing the record data being written, by changing reversibly the optical characteristic locally, on the recording section of the recording medium to be reused; and a number-of-times writer for writing the data indicating the number of recycle times of the recording medium into the specific area of the recording medium by changing reversibly the optical characteristic locally upon receipt of the number-of-recycle-times write command.

12. The recording medium collection and processing apparatus as claimed in claim 11, further comprising a write head for writing the data indicating the number of recycle times in a bar code form.

\* \* \* \* \*